(12) United States Patent
Tajima

(10) Patent No.: US 9,571,677 B2
(45) Date of Patent: Feb. 14, 2017

(54) IMAGE PROCESSING APPARATUS AND NON-TRANSITORY COMPUTER READABLE MEDIUM

(71) Applicant: FUJI XEROX CO., LTD., Tokyo (JP)

(72) Inventor: Yukio Tajima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/627,675

(22) Filed: Feb. 20, 2015

(65) Prior Publication Data

US 2016/0088171 A1    Mar. 24, 2016

(30) Foreign Application Priority Data

Sep. 19, 2014 (JP) ................. 2014-191823

(51) Int. Cl.
| | |
|---|---|
| *G06F 15/00* | (2006.01) |
| *H04N 1/00* | (2006.01) |
| *H04N 1/32* | (2006.01) |
| *H04N 1/21* | (2006.01) |

(52) U.S. Cl.
CPC ...... *H04N 1/00347* (2013.01); *H04N 1/00204* (2013.01); *H04N 1/21* (2013.01); *H04N 1/32064* (2013.01); *H04N 2201/0039* (2013.01); *H04N 2201/0044* (2013.01); *H04N 2201/0094* (2013.01)

(58) Field of Classification Search
CPC ............................. H04N 2201/0039
USPC ................................. 358/1.13–1.18
See application file for complete search history.

(56) References Cited

U.S. PATENT DOCUMENTS

| 8,482,750 | B2 | 7/2013 | Yoshihara | |
| 2007/0035765 | A1* | 2/2007 | Corona | H04N 1/00278 |
| | | | | 358/1.15 |

FOREIGN PATENT DOCUMENTS

| JP | 11-120369 A | 4/1999 |
| JP | 2008-123094 A | 5/2008 |

* cited by examiner

*Primary Examiner* — Saeid Ebrahimi Dehkordy
(74) *Attorney, Agent, or Firm* — Sughrue Mion, PLLC

(57) ABSTRACT

An image processing apparatus includes a printing unit, a storage unit, and a processing unit. The storage unit stores communication addresses of image processing apparatuses in a group to which the apparatus belongs. In response to a request for registration in the group from a different image processing apparatus, the processing unit causes the storage unit to store a communication address of the different image processing apparatus, and transmits a registration commission for registering the communication address of the different image processing apparatus in the group to the image processing apparatuses in the group using the communication addresses stored in the storage unit.

3 Claims, 9 Drawing Sheets

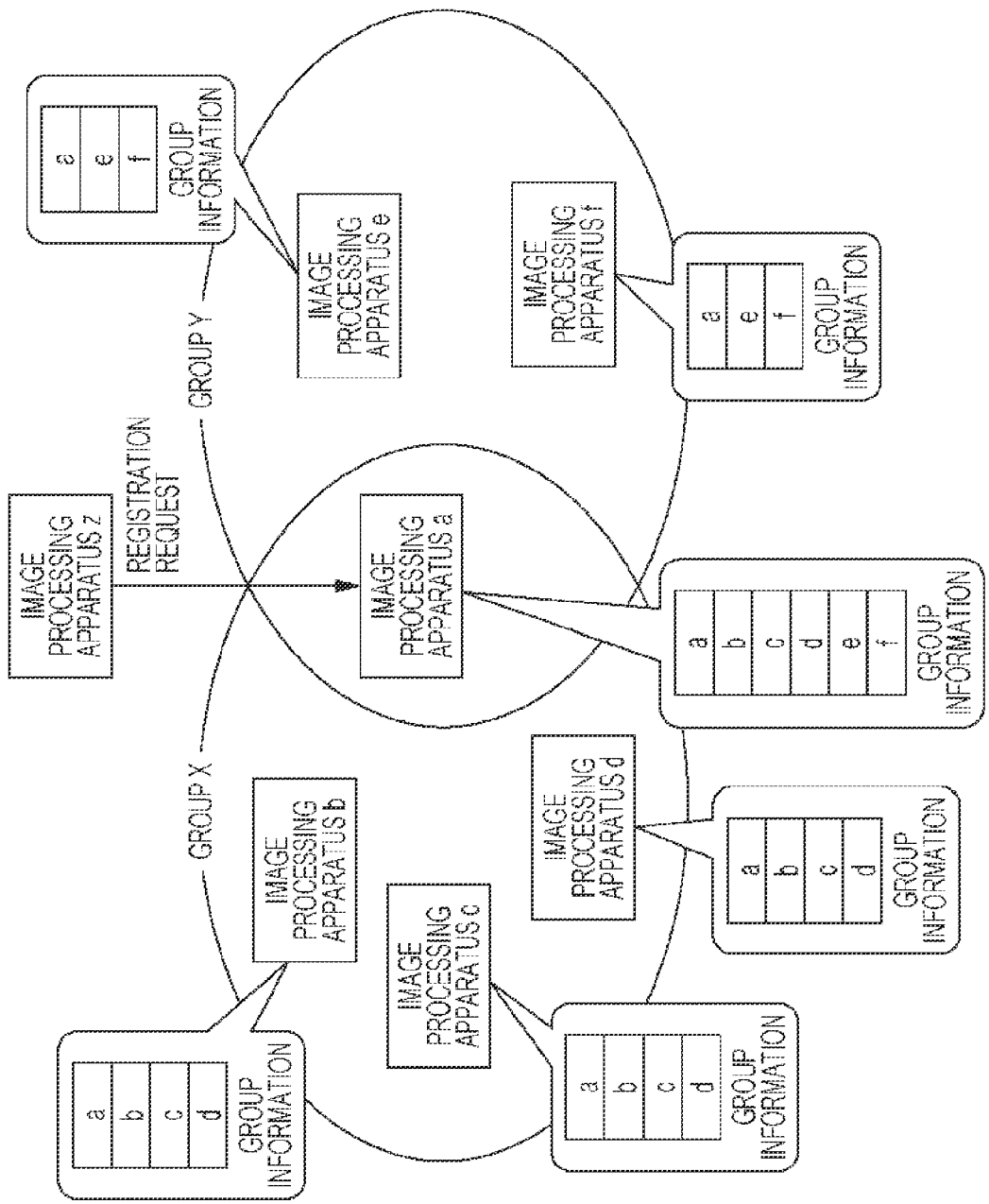

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-191823 filed Sep. 19, 2014.

BACKGROUND (i) Technical Field

The present invention relates to an image processing apparatus and a non-transitory computer readable medium.

(ii) Related Art

There is known a system in which plural image processing apparatuses cooperate with each other to form one group and a document accumulated in an image processing apparatus A in the group is selected by operating a local operation panel of a different image processing apparatus B in the same group to be printed by the image processing apparatus B. In order to establish such a system, it is necessary for each image processing apparatus in the group to have the communication addresses of the other image processing apparatuses in the same group registered.

SUMMARY

According to an aspect of the present invention, there is provided an image processing apparatus including: a printing unit; a storage unit that stores communication addresses of image processing apparatuses in a group to which the apparatus belongs; and a processing unit that, in response to a request for registration in the group from a different image processing apparatus, causes the storage unit to store a communication address of the different image processing apparatus and transmits a registration commission for registering the communication address of the different image processing apparatus in the group to the image processing apparatuses in the group using the communication addresses stored in the storage unit.

BRIEF DESCRIPTION OF THE DRAWINGS

An exemplary embodiment of the present invention will be described in detail based on the following figures, wherein:

FIG. 9 illustrates an example of group information for a case where an image processing apparatus belongs to plural groups.

DETAILED DESCRIPTION

An exemplary embodiment of the present invention will be described below with reference to the drawings.

Figure 1:
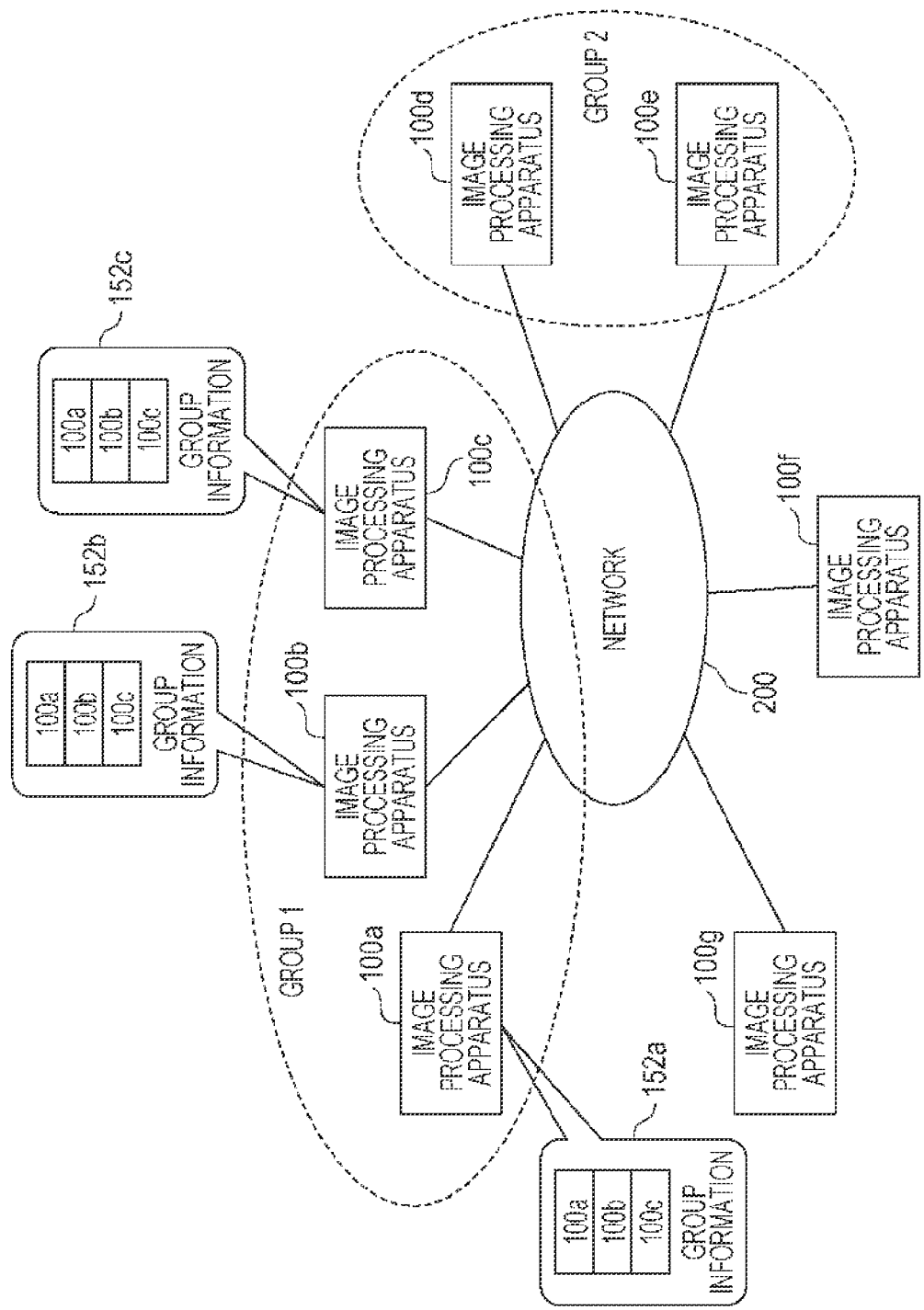
FIG. 1 illustrates a system in which plural image processing apparatuses form a group.

As illustrated in FIG. 1, image processing apparatuses 100a to 100g (hereinafter referred to collectively as "image processing apparatuses 100" in the case where it is not necessary to distinguish them) according to the exemplary embodiment are communicable with each other via a network 200 for data communication such as a local area network (LAN). A communication address (e.g. an IP address) for communication over the network 200 is assigned to each of the image processing apparatuses 100.

The image processing apparatus 100 is a device that has a function of receiving print data (hereinafter referred to also as a "document") to print the print data. Examples of the image processing apparatus 100 include a digital printer and a digital multi-function machine (a device that has functions of a printer, a scanner, a copier, a facsimile, etc.). The image processing apparatus 100 receives print data via the network 200 from a client device (not illustrated) such as a personal computer or a portable terminal (e.g. a smartphone). The image processing apparatus 100 may also have a function of receiving print data from a portable terminal of a user through proximity wireless communication such as near field communication (NFC) or Bluetooth (trademark).

The illustrated image processing apparatus 100 may form a group with other image processing apparatuses 100. A document (print data) input to and accumulated in any image processing apparatus 100 in the group may be printed and output from any image processing apparatus 100 in the same group. This scheme is serverless (i.e. does not use a server), achieved through cooperation (which will be discussed in detail later) among the plural image processing apparatuses 100. That is, the scheme does not use a server such as a print server that centrally manages input documents (print data). Such a function that allows a document accumulated in an image processing apparatus 100 in the group to be printed from any image processing apparatus 100 in the same group is hereinafter referred to as a "group printing function".

The image processing apparatuses 100a to 100g store group information 152a to 152g (only group information 152a to 152c is illustrated in the drawing), respectively, that represents the group to which the apparatus belongs. The group information 152a to 152g (hereinafter referred to collectively as "group information 152" in the case where it is not necessary to distinguish them) includes a list of the communication addresses of the image processing apparatuses 100 included in the group to which the apparatus belongs. In the example of FIG. 1, the image processing apparatuses 100*a*, 100*b*, and 100*c* form one group ("group 1"), and hold the group information 152*a*, 152*b*, and 152*c*, respectively, which includes a list of the communication addresses of the three image processing apparatuses 100*a*, 100*b*, and 100*c*.

When a focus is placed on one image processing apparatus 100, the group information 152 of the image processing apparatus 100 may be considered as indicating the communication addresses of image processing apparatuses 100 with which the image processing apparatus 100 cooperates for the group printing function.

Specific examples of the usage include a scene where the overall system of FIG. 1 is composed of a large number of image processing apparatuses 100 that are present in one company, for example, and the large number of image processing apparatuses 100 are divided into several groups in accordance with the manner of operation in the company.

Figure 2:
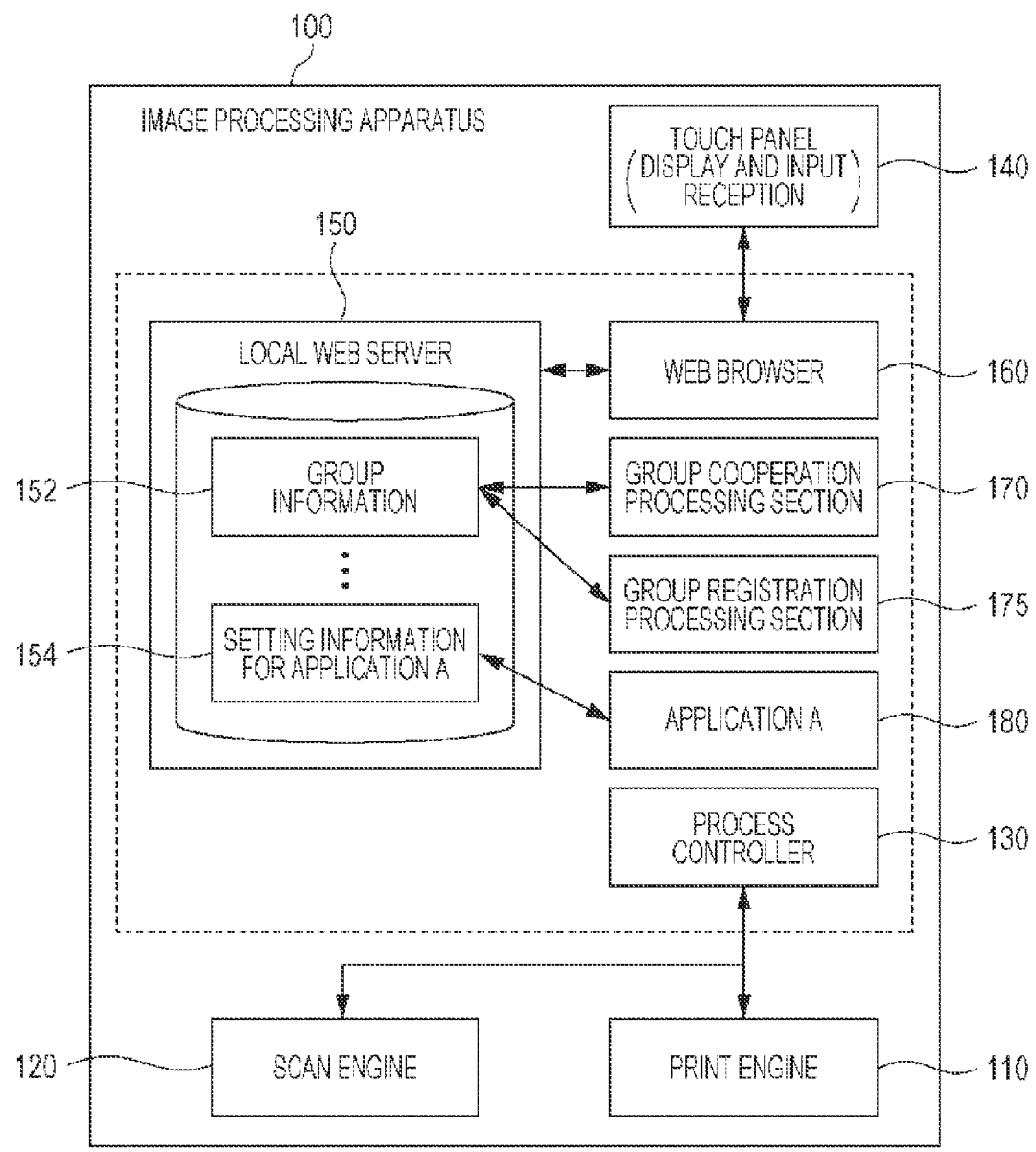
FIG. 2 illustrates an example of the functional configuration of an individual image forming apparatus.

FIG. 2 illustrates an example of the internal configuration of an individual image forming apparatus 100.

In the image processing apparatus 100 illustrated in FIG. 2, a print engine 110 is a mechanism that forms (prints) an image on a medium such as paper. A scan engine 120 is a mechanism that optically reads an image on a medium to generate image data that represent the read image.

A process controller 130 controls the print engine 110 and the scan engine 120, and executes a process specified by the user. For example, the process controller 130 converts print data received from a personal computer or the like of the user via the network 200 or the like into image data that may be received by the print engine 110, and supplies the image data to the print engine 110 to cause the print engine 110 to print the image data. The process controller 130 also controls the scan engine 120 so as to read an image in a document, and saves the read image data in a local storage region or transmits the image data to a personal computer or the like on the network. In addition, the process controller 130 achieves a copying process by causing the print engine 110 to print an image read by the scan engine 120.

The process controller 130 also has a function of storing (accumulating) print data (a document) received from the user via the network 200 or the like in a storage device (not illustrated) in the image processing apparatus 100 in correlation with identification information (called "user ID") on the user. The user ID of the user that inputs the print data may be acquired by the image processing apparatus 100 by authenticating the user when the user commissions the image processing apparatus 100 to accumulate the print data. In FIG. 2, the image processing apparatus 100 includes printing, scanning, and copying functions. However, this is merely exemplary. The image processing apparatus 100 may additionally have a function of transmitting and receiving a document by facsimile, or may be a device with a single function such as printing. This also applies to modifications to be discussed later.

A touch panel 140 is a device that serves as a local user interface (UI) of the image processing apparatus 100, and displays a UI screen and receives input from the user to the UI screen through a touch operation. The image processing apparatus 100 may have a display device and an input device with mechanical buttons and numeric keys in place of or in addition to the touch panel as a device for local UI.

The UI screen displayed on the touch panel 140 (or the display device for local UI) is provided in the form of a web page from a local web server 150 installed in the image processing apparatus 100. That is, the web page for UI is supplied from the local web server 150 to a web browser 160 also installed in the image processing apparatus 100, and the web browser 160 generates an image of the UI screen from data on the web page to display the image on the touch panel 140. In addition, the web browser 160 acquires input from the user through a touch operation on the UI screen, and sends an HTTP (HyperText Transfer Protocol) request matching the input to the local web server 150.

The web browser 160 sends an HTTP request requesting a web page that represents a main menu screen to the local web server 150, for example, and displays a web page provided in accordance with the HTTP request on the touch panel 140. When the user selects a desired menu on the web page for the main menu, the web browser 160 sends an HTTP request generated from a URL (Uniform Resource Locator) set to the selected menu to the local web server 150. In the case where the URL set to the selected menu indicates a different menu, for example, a web page for the different menu is returned from the local web server 150 to the web browser 160.

In the case where the URL set to the selected menu indicates a web application, the local web server 150 invokes the application. The invoked application executes a process, and returns the result of the process to the local web server 150. The local web server 150 generates a web page including the result of the process performed by the application, and returns the web page to the web browser 160.

The "application" is a web application program that utilizes various functions of the image processing apparatus 100. The "application" is prepared using HTML (HyperText Markup Language), JavaScript (registered trademark), or the like, for example, and installed in the image processing apparatus 100.

The local web server 150 may provide plural applications. Such plural applications include a group cooperation processing section 170, a group registration processing section 175, an application A 180, and so forth. The local web server 150 holds setting information (such as group information 152 and setting information 154) to be referenced by such applications. The application invoked by the local web server 150 executes a process in accordance with the corresponding setting information 152 or 154. The group information 152, which is one piece of the setting information, is referenced when the group cooperation processing section 170 (which will be discussed in detail later) executes a process. In addition, the group information 152 is generated along with a registration process (which will be discussed in detail later) for registering the image processing apparatus 100 in an existing group performed by the group registration processing section 175.

The group cooperation processing section 170 executes a process for the group printing function discussed earlier.

For example, the group cooperation processing section 170 collects lists of documents registered by the user in accordance with an instruction from the (authenticated) user who operates the local UI of the image processing apparatus 100, from the image processing apparatus 100 or different image processing apparatuses 100 on the network 200 that cooperate with the image processing apparatus 100 (i.e. in the same group), and integrates the collected lists to generate a printing target select screen. During the collection, the group cooperation processing section 170 transmits a document list request including the user ID of the user as the requesting entity as a parameter using the communication addresses of different image processing apparatuses 100 included in the group information 152 as the destinations. Then, the group cooperation processing section 170 acquires lists of documents returned from the image processing apparatuses 100 as the destinations in response to the request to generate a printing target select screen. The printing target select screen is displayed on the touch panel 140 via the web browser 160 to allow the user to select a document that the user currently desires to print from the screen. The result of the selection is transferred to the group cooperation processing section 170 via the web browser 160 and the local web server 150. The group cooperation processing section 170 requests the selected document from the image processing apparatus 100 which stores the document, and delivers the document acquired in response to the request to the process controller 130 and instructs the process controller 130 to print the document.

Meanwhile, when a document list request including a user ID is received from a different image processing apparatus 100, the group cooperation processing section 170 generates a list of documents corresponding to the user ID and accumulated in the apparatus, and returns the generated list to the image processing apparatus 100 as the requesting entity. In addition, when a request to acquire a document in the list arrives from the image processing apparatus 100 to which the list has been provided, the group cooperation processing section 170 transmits the document to the image processing apparatus 100. Such processes for responding to requests related to the group printing function from the different image processing apparatuses 100 may be implemented as a normal program, rather than as a web application.

The group registration processing section 175 executes a process for registering the image processing apparatus 100 in a group that already exists on the network 200. The process performed by the group registration processing section 175 will be described in detail later.

The application A 180 is illustrated as an example of the applications other than the group cooperation processing section 170 and the group registration processing section 175, and may execute a process with any content. For example, the application A 180 may be an application that executes password authentication. The application A 180 may also be an application that generates a screen for print setting such as the number of copies to be printed and whether or not double-sided printing is performed. An initial print setting screen provided by the application for print setting screen generation displays default print setting registered by the user, and the user changes the values of setting items from the default values on the setting screen as necessary. For the application, information on default print setting for each user is held in the local web server 150 as the setting information.

The functions of elements surrounded by the broken line in the drawing, namely the process controller 130, the local web server 150, the web browser 160, and the applications, among the constituent elements of the image processing apparatus 100 described above, are implemented by a computer built in the image processing apparatus 100 by executing a program corresponding to each element.

Thus, the image processing apparatus 100 of FIG. 2 constitutes the UI through the local web server 150 and the web browser 160 built in the image processing apparatus 100. If access to the local web server 150 from a device that is external to the image processing apparatus 100 (e.g. a device on the Internet) is permitted, information on a web page in the local web server 150 is acquired by the external device, which is not good in terms of security. For example, in the case where a web page including a script of a web application is acquired by an external device, the script may be analyzed and utilized to attack the image processing apparatus 100. Therefore, the local web server 150 does not receive an HTTP (HyperText Transfer Protocol) request from an external device. Therefore, the setting information 152, 154, etc. on each application managed by the local web server 150 may not be updated in accordance with an instruction from an external device. In this case, in order to register the image processing apparatus 100 in an existing group so that the image processing apparatus 100 may utilize the group printing function, for example, it is necessary to display a screen for input of the communication addresses of the image processing apparatuses 100 which form a group with the image processing apparatus 100 on the touch panel 140, and to manually input the communication addresses of the image processing apparatuses 100 to the screen, for example. It is also necessary to add the image processing apparatus 100 to the group by manually inputting the communication address of the image processing apparatus 100 to be newly registered to the image processing apparatuses 100 in the group to which the image processing apparatus 100 is to be registered. However, it is troublesome to manually input the communication addresses of all the image processing apparatuses 100 which constitute the group. Thus, the exemplary embodiment provides a scheme that enables joining of the image processing apparatus 100 by inputting the communication address of one of the image processing apparatuses 100 in an existing group that the image processing apparatus 100 is desired to join.

A consideration is given to a case where the user attempts to cause a certain image processing apparatus 100z (not illustrated) to newly join an existing group 1 (see FIG. 1) composed of the image processing apparatuses 100a to 100c, for example. In this case, in the exemplary embodiment, the user inputs the communication address of one (e.g. the image processing apparatus 100a) of the image processing apparatuses in the group 1 to the image processing apparatus 100z. Then, the group registration processing section 175 in the image processing apparatus 100z issues a registration request to the image processing apparatus 100a using the communication address. When the registration request is received, the group registration processing section 175 of the image processing apparatus 100a registers the communication address of the image processing apparatus 100z in the group information 152 in the apparatus, and returns the group information 152 to the image processing apparatus 100z. Consequently, the group information 152 indicating the group to which the image processing apparatus 100a belongs is held in the image processing apparatus 100z. In addition, the image processing apparatus 100a commissions each image processing apparatus 100 in the group to register the image processing apparatus 100z in the group using each communication address included in the group information 152. Consequently, the other apparatuses which belong to the group also add the communication address of the image processing apparatus 100z to the group information 152.

The scheme for group registration in the exemplary embodiment has been roughly described above. Next, an example of the process procedure performed by the group registration processing section 175 in order to implement the scheme will be described.

Figure 3:
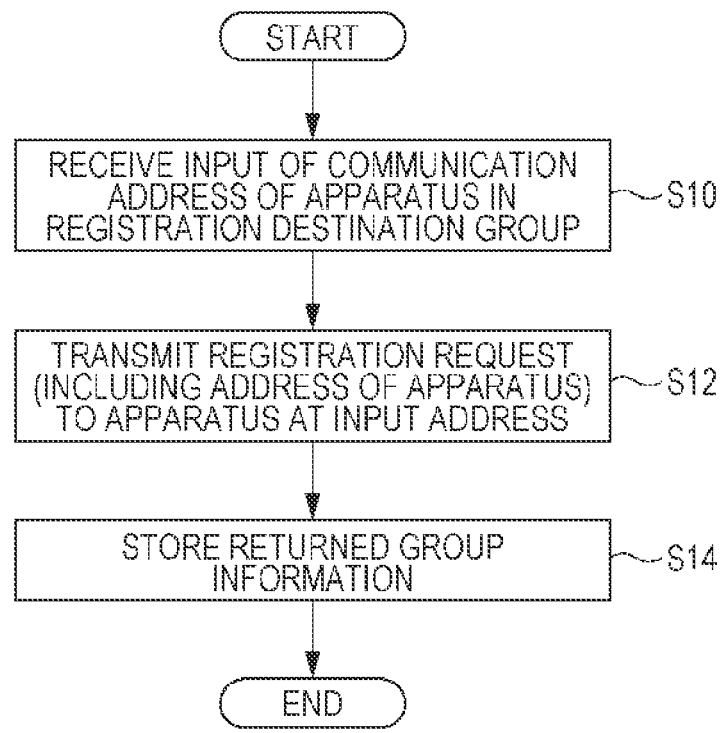
FIG. 3 illustrates an example of the process procedure performed by a group registration processing section in an image processing apparatus as the registration target that is to be registered in an existing group.

FIG. 3 illustrates an example of the process procedure performed by the group registration processing section 175 in the image processing apparatus 100 as the registration target that is to be registered in an existing group.

In the case where the user selects a process for registering the image processing apparatus 100 (in the above example, 100z) in an existing group on the menu screen provided by the local web server 150, for example, the group registration processing section 175 generates an input screen for input of the communication address of one (in the above example, 100*a*) of the image processing apparatuses 100 which belong to the group, and displays the generated input screen on the touch panel 140 by way of the web browser 160. The user obtains the communication address of one of the image processing apparatuses 100 in the group as the registration destination in advance, and inputs the communication address to the input screen. The group registration processing section 175 acquires the input communication address (S10), generates a registration request including the communication address of the apparatus as a parameter, and sends the generated registration request to the network 200 using the acquired communication address as the destination (S12). The registration request is received by the image processing apparatus 100 at the destination communication address. Then, the group registration processing section 175 registers group information returned from the image processing apparatus 100 having received the registration request in the local web server 150 as setting information (group information 152) for the group cooperation processing section 170 (S14).

Next, with reference to FIG. 4, an example of the process procedure performed by the group registration processing section 175 when a request for registration in the group is received from a different image processing apparatus 100 will be described. In the case where a registration request is received from a different image processing apparatus 100 (S20), the group registration processing section 175 determines whether or not the communication address of the image processing apparatus 100 as the registration target (i.e. the request transmitting entity) included in the registration request is included in the group information 152 in the apparatus (S22). In the case where it is determined that the communication address of the image processing apparatus 100 is included, the group registration processing section 175 returns a response indicating that the image processing apparatus 100 has already been registered in the group to the image processing apparatus 100 as the requesting entity (S23).

In the case where it is determined in S22 that the communication address of the image processing apparatus 100 is "not included", the group registration processing section 175 adds the communication address of the registration target included in the registration request to the group information 152 in the apparatus (S24). Consequently, the group cooperation processing section 170 of the image processing apparatus 100 recognizes the image processing apparatus 100 as the requesting entity as a member of the group.

It is conceivable that there is an upper limit for the number of image processing apparatuses 100 that constitute a group, and that the number of members of the group of the group information 152 to which the image processing apparatus 100 as the requesting entity is to be added in S24 has reached the upper limit. In this case, for example, the image processing apparatus 100 with the oldest time and date of the last access in the group may be deleted from the group, and the image processing apparatus 100 as the registration requesting entity may be added to the group instead.

The group cooperation processing section 170 transmits the group information 152 (which may or may not include the communication address of the requesting entity) in the apparatus to the image processing apparatus 100 as the requesting entity (S26). The group registration processing section 175 sends a commission for registration in the group to each communication address included in the group information 152 (S28). The registration commission includes the communication address of the requesting entity.

Figure 4:
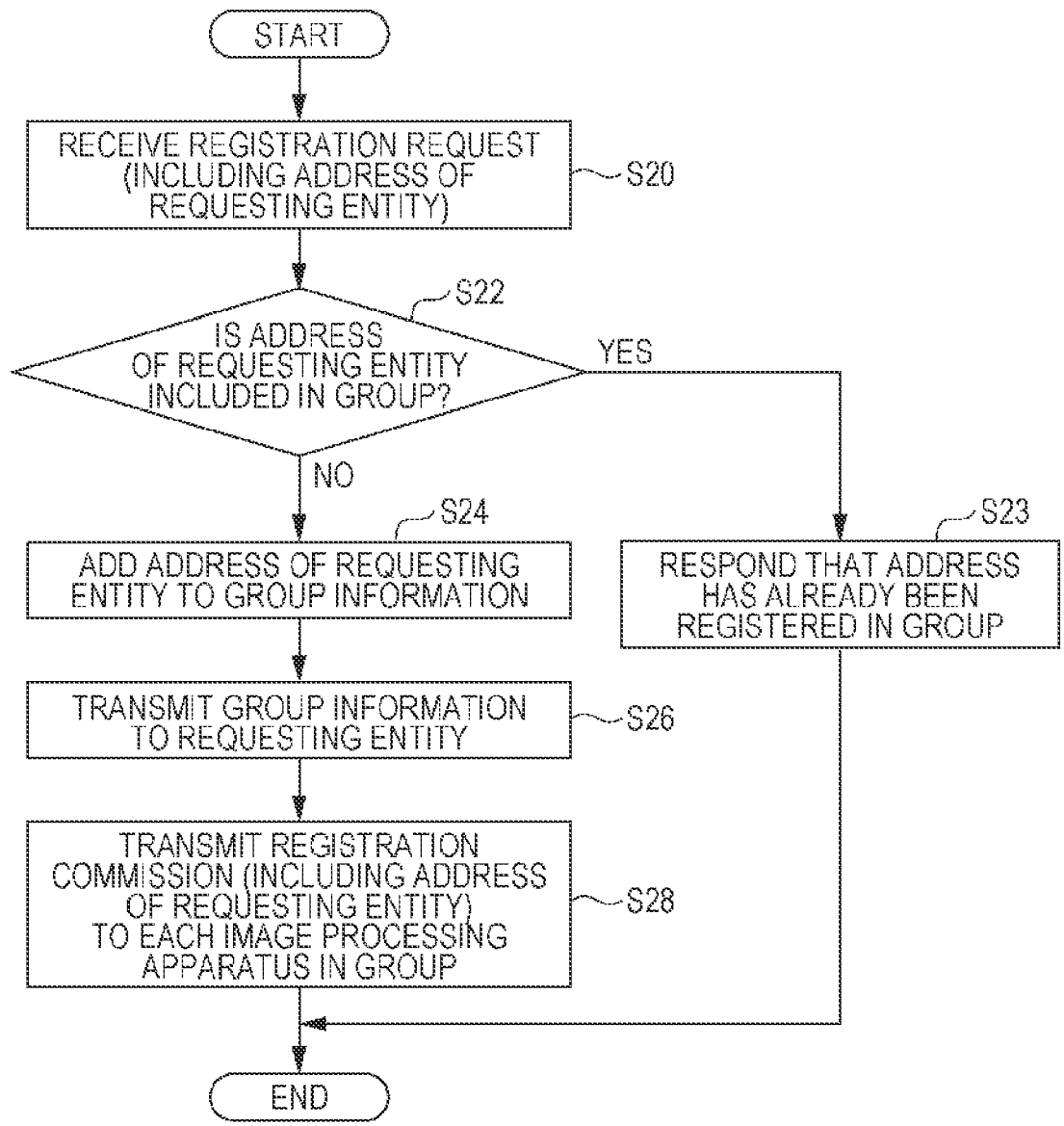
FIG. 4 illustrates an example of the process procedure performed by the group registration processing section when a request for registration in the group is received from a different image processing apparatus.

When the registration commission is received, the group registration processing section 175 of the image processing apparatus 100 may perform a process that is similar to that in FIG. 4. That is, if the communication address of the registration target included in the registration commission is already included in the group information 152 in the apparatus, the group registration processing section 175 replies so (S23). If not, the group registration processing section 175 adds the communication address to the group information 152 (S24). In this case, the image processing apparatus 100 as the registration commission transmitting entity has already been registered in the group. Thus, the process in S26 (transmission of the group information to the image processing apparatus 100 as the transmitting entity) is not required. The communication address of the image processing apparatus 100 as the registration commission transmitting entity is different from the communication address of the image processing apparatus 100 as the registration target included in the registration commission. Thus, it is determined on the basis of such communication addresses that the process in S26 may not be performed. For a similar reason, the group registration processing section 175 may not execute the process in S28 (transmission of the registration commission to the communication address included in the group information 152).

An example of the process performed by the group registration processing section 175 of the image processing apparatus 100 according to the exemplary embodiment has been described above. In the example described above, the group registration processing section 175 performs both a process for receiving from the user an instruction for registration of the image processing apparatus 100 in an existing group and sending a registration request to a different image processing apparatus 100, and a process for handling a registration request or a registration commission from a different image processing apparatus 100. However, both the processes may be implemented as separate applications.

There are cases where when a registration request is transmitted to a different image processing apparatus 100 in the group in S28, the registration request may be not processed because the image processing apparatus 100 as the transmission destination is turned off or the like. A modification of the process performed by the group registration processing section 175 for handling such cases will be described with reference to FIGS. 5 and 6.

Figure 5:
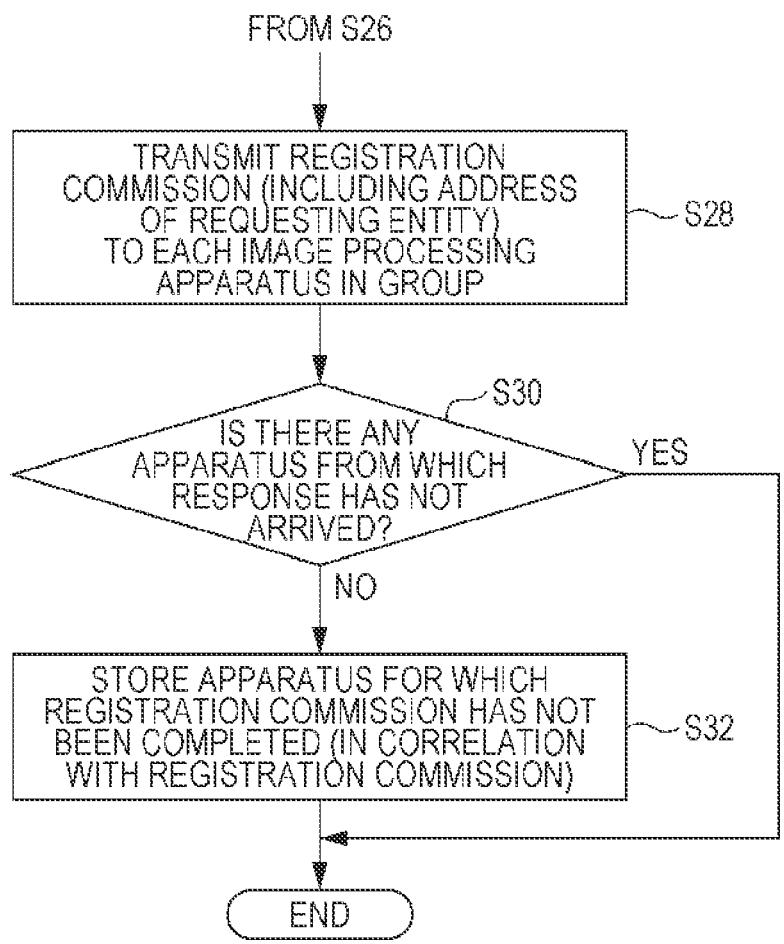
FIG. 5 illustrates an example of the process procedure according to a modification with a consideration given to a case where an image processing apparatus as a destination for transmission of a registration commission is halted.

FIG. 5 is a modification of the process procedure of FIG. 4, and only steps in and after S28 which have been modified are illustrated. That is, in the example of FIG. 5, in the case where a request for registration in the group is received from a different image processing apparatus 100, the group registration processing section 175 sends a registration commission including the communication address of the image processing apparatus 100 as the requesting entity to each image processing apparatus 100 in the group to which the apparatus belongs in S28, and thereafter waits for a response from the image processing apparatuses 100 as the transmission destinations (S30). If the image processing apparatus 100 as the transmission destination is in operation, there should be a response indicating completion of registration, or a response indicating that the communication address as the registration target has already been registered. If either response is returned from a transmission destination before a waiting time determined in advance elapses since the time of transmission in S28, the process for the transmission destination may be ended. In the case where there is an image processing apparatus 100 from which no response is returned during the waiting time, information indicating non-completion of the registration commission including the communication address of each image processing apparatus 100 from which no response is returned and the communication address of the image processing apparatus 100 as the registration target indicated in the registration request received in S20 is stored (S32).

In the modification, each image processing apparatus 100 sends a notification (called "start notification") indicating that the image processing apparatus 100 has been started to each communication address included in the group information 152 in the apparatus as a part of a starting process performed when the image processing apparatus 100 is turned on.

Figure 6:
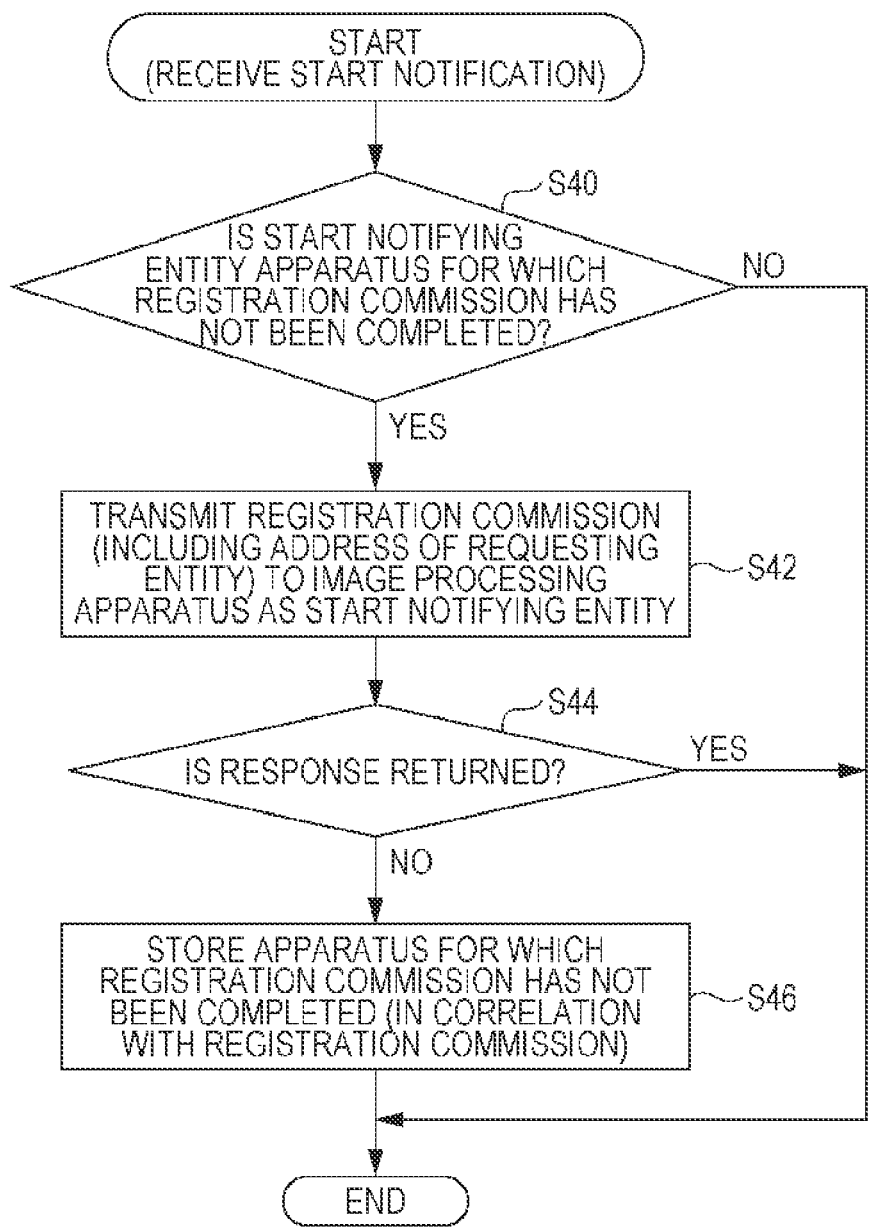
FIG. 6 illustrates an example of the process procedure performed when the image processing apparatus which has been halted is started.

In the case where a start notification is received from a different image processing apparatus 100, as illustrated in FIG. 6, the group registration processing section 175 checks whether or not the address of the image processing apparatus 100 as the start notification transmitting entity is included in the stored information indicating non-completion of the registration commission (S40). If the address is not included, the process is ended.

If the address is included, the group registration processing section 175 transmits a registration commission including the communication address of the image processing apparatus 100 as the registration target included in the information indicating non-completion of the registration commission to the image processing apparatus 100 as the notifying entity (S42). Then, the group registration processing section 175 waits for a response returned from the transmission destination (S44). If a response is returned, the process is ended. In the case where a response is not returned during the waiting time, the transmission destination is stored again as an apparatus for which the registration commission has not been completed (S46).

In the modification of FIGS. 5 and 6, a start notification is sent to each image processing apparatus 100 in the group to which the apparatus belongs when the image processing apparatus 100 is started. However, the method by which the image processing apparatus 100 which issued a registration commission knows that a different image processing apparatus 100 for which the registration commission has not been completed is started is not limited thereto. Instead, for example, the image processing apparatus 100 which issued a registration commission may regularly check if a different image processing apparatus 100 for which the registration commission has not been completed is started, or may regularly issue a registration commission.

Next, a second modification will be described with reference to FIGS. 7 and 8. In the second modification, the image processing apparatus 100 may belong to two or more groups. Then, in the case where the image processing apparatus 100 as the destination for transmission of a registration request belongs to plural groups, and in the case where the image processing apparatus 100 as the registration target is a high-function device, the image processing apparatus 100 as the registration target is registered in all the plural groups. This is intended to improve the convenience of the entire system, for example.

Figure 7:
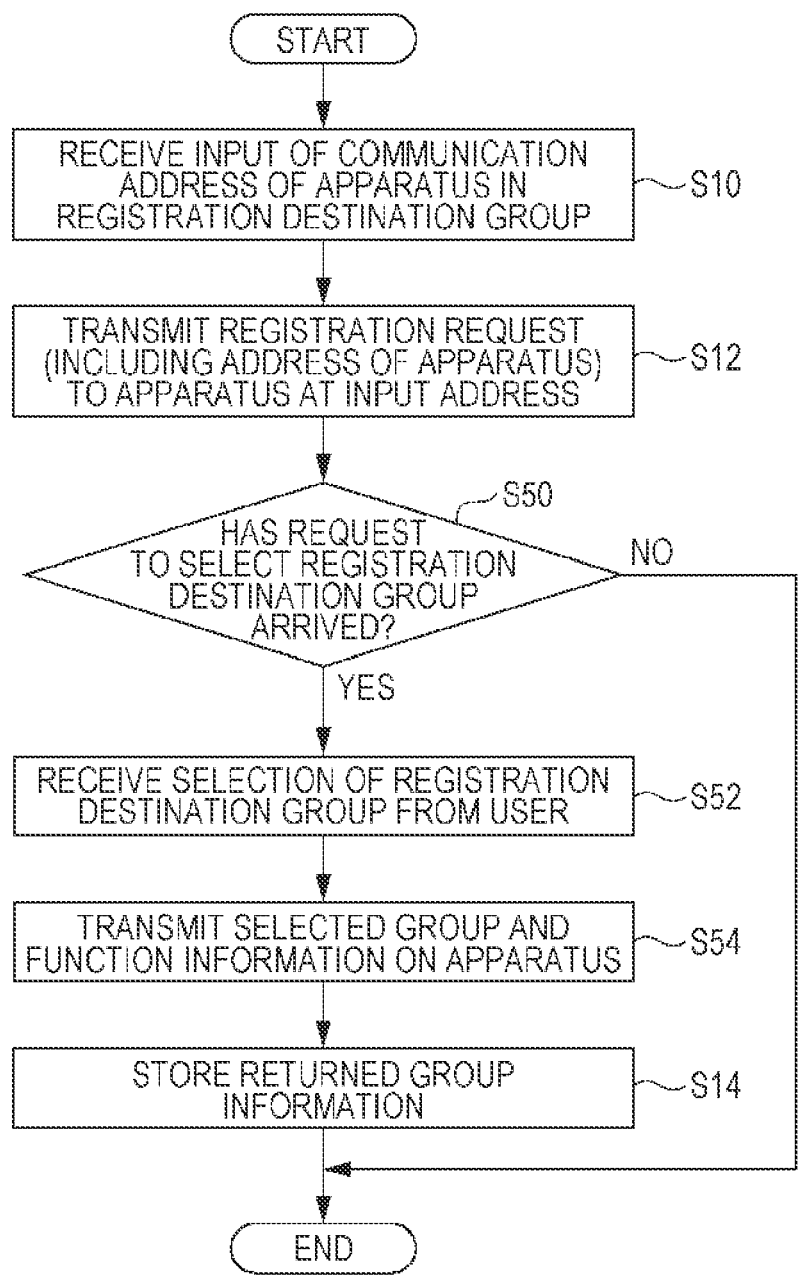
FIG. 7 illustrates an example of the process procedure performed by a group registration processing section of an image processing apparatus as the registration target that is to be registered in an existing group according to a second modification.

FIG. 7 illustrates an example of the process procedure performed by a group registration processing section 175 of an image processing apparatus as the registration target that is to be registered in an existing group according to the second modification. The procedure is the same as the procedure of FIG. 3 in that a registration request is sent in S12 to a communication address input in S10. After S12, it is determined whether or not a request to select a registration destination group has arrived from the image processing apparatus 100 as the destination for transmission of the registration request (S50). In the case where a request to complete registration arrives from the transmission destination before a request to select a registration destination group arrives (No in S50), the process is ended. In the case where a select request arrives, the group registration processing section 175 displays a select screen on which information indicating the configuration of each group included in the select request (e.g. a list of image processing apparatuses 100 that belong to each group) is displayed on the touch panel 140, for example, and receives a selection from the user (S52). Plural registration destination groups may be selected. When a selection is received, the group registration processing section 175 transmits to the image processing apparatus 100 as the entity transmitting the select request (i.e. the destination for transmission of the registration request) selection result information including information specifying the selected group and function information indicating the function of the image processing apparatus 100 (S54). The function information is expressed by a combination of the presence or absence of function items (or the function level of the items) such as whether or not full-color printing is supported, whether or not printing on A3 paper is supported, and whether or not postprocessing such as stapling is provided, for example. After that, when group information is returned from the image processing apparatus 100 as the destination for transmission of the registration request, the group information is stored in the local web server 150 (S14). There are cases where group information on plural groups is returned from the image processing apparatus 100 as the destination for transmission of the registration request. In such cases, plural pieces of group information are stored.

Figure 8:
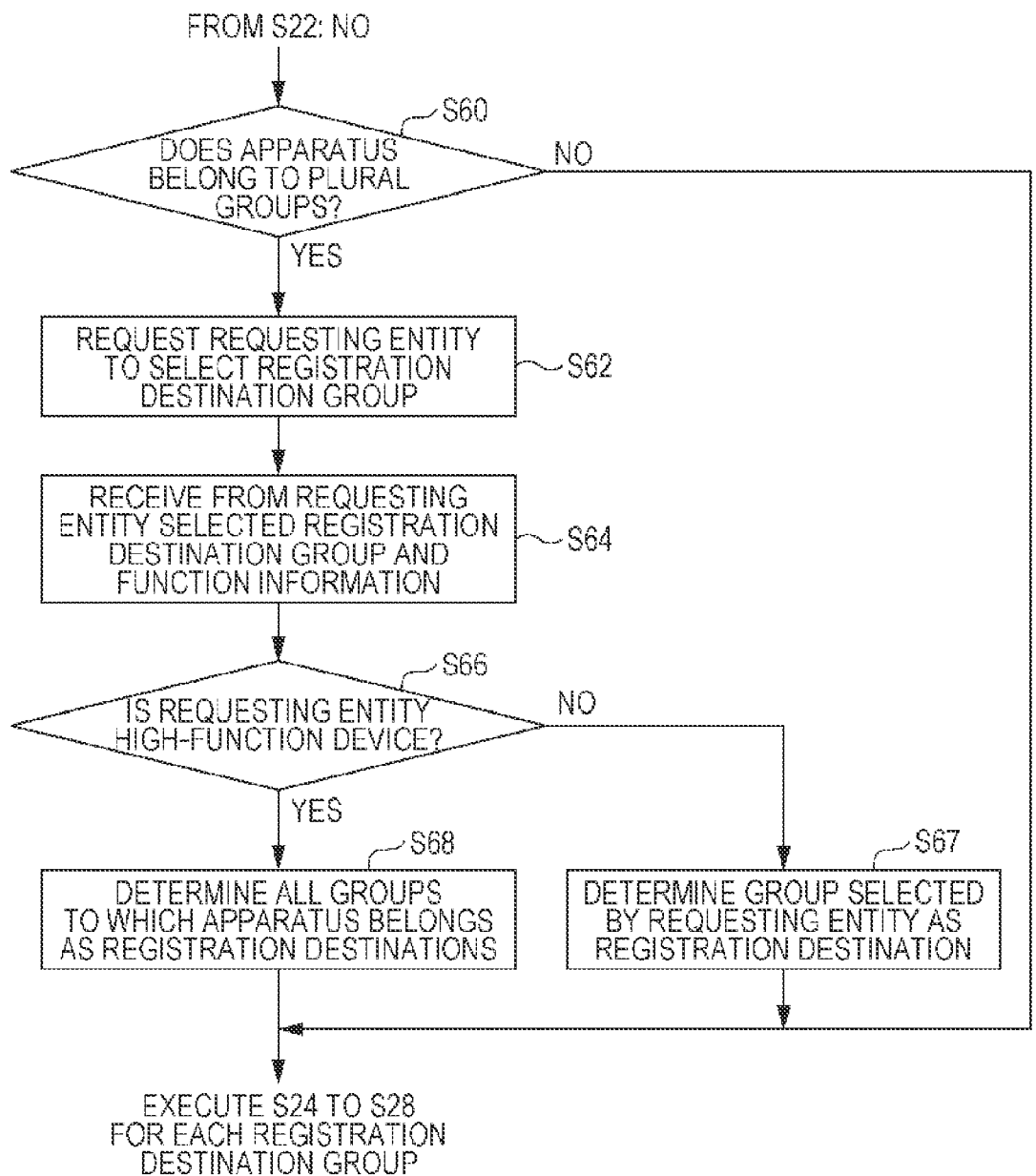
FIG. 8 illustrates an example of the process procedure performed by the group registration processing section when a request for registration in the group is received from a different image processing apparatus according to the second modification.

A principal portion of the process executed by the image processing apparatus 100 which has received a registration request transmitted in S12 from the image processing apparatus 100 operated by the user is illustrated in FIG. 8. The procedure of FIG. 8 is inserted between S22 and S24 in the procedure of FIG. 4. When the image processing apparatus 100 receives a request for registration in the group from a different image processing apparatus 100, and in the case where it is determined in S22 of FIG. 4 that the entity transmitting the registration request is not included in the group to which the apparatus belongs, the group registration processing section 175 determines whether or not the image processing apparatus 100 belongs to plural groups (S60). In the case where the image processing apparatus 100 belongs to only one group, the process proceeds to S24 as in the procedure of FIG. 4. In the case where it is determined that the image processing apparatus 100 belongs to plural groups, the group registration processing section 175 transmits a selection request to select a registration destination from the plural groups to the image processing apparatus 100 as the entity transmitting the registration request (S62). The select request includes information on the configuration of members of each of the plural groups. The member configuration information for each group may include the communication address of each image processing apparatus 100 that belongs to the group and description information that describes the characteristics of each image processing apparatus 100. The description information may include one or more of description of the location of installation (e.g. the room or the department of installation) of the image processing apparatus 100, description of the functions (e.g. the presence or absence of full-color printing and postprocessing functions) of the image processing apparatus 100, and so forth. The description information may be input by the user when the user performs an operation for registering the image processing apparatus 100 in an existing group (S10 of FIG. 3), for example. The input description information is included in the registration request transmitted in S12 in correlation with the communication address of the image processing apparatus 100. Then, the description information is incorporated in the group information 152 in the image processing apparatus 100 as the destination for transmission of the registration request in correlation with the communication address, and further also incorporated in the group information 152 in different image processing apparatuses 100 which belong to the group via a registration commission for the different image processing apparatuses 100.

Next, the group registration processing section 175 receives a response (S54 of FIG. 7) to the select request transmitted in S62, that is, the selected group and the function information on the registration requesting entity, from the image processing apparatus 100 as the registration requesting entity (S64). Then, the group registration processing section 175 determines on the basis of the function information whether or not the image processing apparatus 100 as the registration requesting entity is a "high-function device" that meets a condition determined in advance (S66). The determination condition may be set such that the image processing apparatus 100 which supports all of full-color printing, A3 paper printing, and postprocessing functions is determined as "high-function", such that the image processing apparatus 100 which supports two or more of the three functions is determined as "high-function", or the like. The determination condition may be set by a system manager or the like.

If the result of determination in S66 indicates that the image processing apparatus 100 "is not a high-function device", the group registration processing section 175 determines only the group selected by the registration requesting entity as the destination for registration of the image processing apparatus 100 as the registration requesting entity (S67), and the process proceeds to S24.

If the result of determination in S66 indicates that the image processing apparatus 100 "is a high-function device", the group registration processing section 175 determines all the groups to which the apparatus belongs as the destination for registration of the image processing apparatus 100 as the registration requesting entity (S68). This is based on a policy that the high-function image processing apparatus 100 is useful to the entire organization if the image processing apparatus 100 is shared by as large a number of groups as possible. In this case, in S24 (see FIG. 4) after S68, the group registration processing section 175 registers the communication address of the image processing apparatus 100 as the registration requesting entity etc. in a list of groups in the group information 152 in the apparatus. In S26, information on each group is transmitted to the registration requesting entity. In S28, a registration commission is transmitted to the image processing apparatuses 100 which belong to each group. Also in the case where the user selects plural groups as the registration destinations using the image processing apparatus 100 as the registration requesting entity, the processes in S24 to S28 are performed in the same manner.

As a modification to the procedure of FIGS. 7 and 8, the image processing apparatus 100 as the registration requesting entity may transmit its function information to the image processing apparatus 100 as the requested entity in S12. The image processing apparatus 100 as the requested entity may determine on the basis of the function information whether or not the requesting entity is a high-function device. In the case where the requesting entity is a high-function device, the requesting entity may be automatically registered in all the groups to which the image processing apparatus 100 as the requested entity belongs without sending a select request to the requesting entity. In this case, only in the case where it is determined that the requesting entity is not a high-function device, a group select request is sent from the image processing apparatus 100 as the requested entity to the image processing apparatus 100 as the requesting entity to receive a desire from the user.

In the case where the image processing apparatus 100 as the registration requesting entity is a high-function device, the image processing apparatus 100 as the registration requesting entity may be asked for approval to register the image processing apparatus 100 in all the groups to which the image processing apparatus 100 as the registration requested entity belongs so that the image processing apparatus 100 is registered in all the groups only in the case where such approval is obtained, rather than the image processing apparatus 100 is automatically registered in all the groups to which the image processing apparatus 100 as the registration requested entity belongs.

It is also conceivable that the image processing apparatus 100 is restricted to holding only one piece of group information. For example, in the example of FIG. 9, an image processing apparatus a belongs to both a group X composed of image processing apparatuses a, b, c, and d and a group Y composed of image processing apparatuses a, e, and f. However, the group information in the image processing apparatus a is one piece of information including the communication addresses of the image processing apparatuses a to f, and does not include information indicating that the four image processing apparatuses a to d and the three image processing apparatuses a, e, and f form separate groups. Meanwhile, the image processing apparatuses b to d belong to only the group X, and the image processing apparatuses e and f belong to only the group Y.

In such a case, the image processing apparatus a receives a group registration request from an image processing apparatus z that does not belong to any of the groups X and Y.

In this case, in one example, the image processing apparatus a adds the communication address of the image processing apparatus z to the group information that the image processing apparatus a possesses, provides the group information to the image processing apparatus z, and sends all the image processing apparatuses b to f included in the group information a commission to register the image processing apparatus z in the group. In the example, the image processing apparatus z belongs to both the groups X and Y as with the image processing apparatus a. For the image processing apparatuses b to d and the image processing apparatuses e and f, meanwhile, the image processing apparatus z is added to the groups X and Y to which each image processing apparatus belongs.

In another example, in the case where a registration request is received from the image processing apparatus z, the image processing apparatus a requests the image processing apparatuses b to f included in the group information in the apparatus for group information possessed by the image processing apparatuses b to f. Then, the image processing apparatus a compares the group information in the image processing apparatuses b to f acquired in response to the request with the group information possessed by the image processing apparatus a itself to recognize that the apparatus belongs to two groups, namely a group composed of the image processing apparatuses a to d and a group composed of the image processing apparatuses a, e, and f. Based on such recognition, the image processing apparatus a may inquire the image processing apparatus z which of the group composed of the image processing apparatuses a to d, the group composed of the image processing apparatuses a, e, and f, and the group composed of the image processing apparatuses a to f the image processing apparatus z desires to be registered in. Also in this case, it may be determined whether or not the image processing apparatus z is a high-function device, and the image processing apparatus z may be registered in all the groups to which the image processing apparatus a belongs in the case where the image processing apparatus z is a high-function device.

A portion (surrounded by the broke line in FIG. 2) of the image processing apparatus 100 described above that processes information may be implemented by causing a general-purpose computer to execute a program that represents processes of various functional modules of the apparatus, for example. The computer has a circuit configuration in which, for example, a microprocessor such as a CPU, a memory (primary storage) such as a random-access memory (RAM) and a read-only memory (ROM), a secondary storage controller that controls a secondary storage such as a hard disk drive (HDD), a solid state drive (SSD), and a flash memory, various input/output (I/O) interfaces, network interfaces that control connection with a wireless or wired network, etc. as hardware are connected via a bus, for example. A disk drive that reads data from and/or writes data into a portable disc recording medium such as a CD, a DVD, and a Blu-ray Disc, a memory reader/writer that reads data from and/or writes data into a portable non-volatile recording medium according to various standards such as a flash memory, etc. may be connected to the bus by way of the I/O interfaces, for example. A program that describes the content of processes performed by the functional modules described above is stored in a secondary storage device such as the flash memory to be installed on the computer by way of a recording medium such as a CD and a DVD or by way of a communication unit such as a network. The program stored in the secondary storage device is read by the RAM and executed by the microprocessor such as a CPU to implement the group of functional modules described above.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A first image processing apparatus comprising:
a print engine;
a storage that stores group information comprising communication addresses of a plurality of image processing apparatuses in a group to which the first image processing apparatus belongs; and
a process controller that, in response to a request for registration in the group of a second image processing apparatus that is received from the second image processing apparatus, automatically adds to and stores in the group information, a communication address of the second image processing apparatus and transmits a registration commission for registering, in the group, the communication address of the second image processing apparatus to the image processing apparatuses in the group, which are different from the first image processing apparatus, using the communication addresses stored in the group information.

2. The image processing apparatus according to claim 1, wherein the storage stores a plurality of group information, each group information comprising communication addresses of image processing apparatuses which belong to a different group to which the first image processing apparatus belongs, and
in a case where the second image processing apparatus meets a condition for a high-function device determined in advance, the process controller automatically adds to and stores the communication address of the second image processing apparatus as a member of the group information of each of the plurality of groups, and transmits to the image processing apparatuses in the plurality of groups a registration commission for registering the communication address of the second image processing apparatus in each of the plurality of groups.

3. A non-transitory computer readable medium storing a program causing a computer provided in a first image forming apparatus to execute a process, the process comprising:
receiving a request for registration of a second image processing apparatus in a group to which the first image processing apparatus belongs, from the second image processing apparatus; and
in response to the request, automatically adding to and storing in group information comprising communication addresses of a plurality of image processing apparatuses in the group to which the first image processing apparatus belongs, a communication address of the second image processing apparatus and transmitting a registration commission for registering, in the group, the communication address of the second image processing apparatus to the plurality of image processing apparatuses in the group, which are different from the first image processing apparatus, using the stored group information.

* * * * *